(12) United States Patent
Tarrant

(10) Patent No.: US 9,726,255 B1
(45) Date of Patent: Aug. 8, 2017

(54) SHACKLE WITH SELF CENTERING CLOSURE CROSS MEMBER

(71) Applicant: Patrick M Tarrant, New York, NY (US)

(72) Inventor: Patrick M Tarrant, New York, NY (US)

( * ) Notice: Subject to any disclaimer, the term of this patent is extended or adjusted under 35 U.S.C. 154(b) by 0 days.

(21) Appl. No.: 15/137,803

(22) Filed: Apr. 25, 2016

(51) Int. Cl.
| | |
|---|---|
| *F16G 15/04* | (2006.01) |
| *F16G 15/06* | (2006.01) |
| *B66C 1/66* | (2006.01) |
| *B66C 1/10* | (2006.01) |
| *B60C 27/08* | (2006.01) |

(52) U.S. Cl.
CPC ............. *F16G 15/06* (2013.01); *B60C 27/08* (2013.01); *B66C 1/10* (2013.01); *B66C 1/66* (2013.01)

(58) Field of Classification Search
CPC ............ F16G 15/06; B66C 1/10; B60C 27/08
USPC ............................................................. 59/86
See application file for complete search history.

(56) References Cited

U.S. PATENT DOCUMENTS

| | | | | |
|---|---|---|---|---|
| 1,458,622 A | * | 6/1923 | Higgins | F16G 15/06 411/357 |
| 1,517,346 A | * | 12/1924 | Crandall | F16G 15/06 59/86 |
| 2,209,007 A | | 7/1940 | Stevenson | |
| 2,259,217 A | | 10/1941 | Stevenson | |
| 2,709,616 A | * | 5/1955 | Larson | F16G 15/06 24/115 R |
| 3,685,285 A | * | 8/1972 | Spilhaug | F16G 15/06 59/86 |
| 4,042,001 A | * | 8/1977 | Muller | B60C 27/08 152/233 |
| 4,095,416 A | | 6/1978 | Issard | |
| 4,147,023 A | | 4/1979 | Weidler | |
| 5,114,260 A | | 5/1992 | Hart | |
| 5,628,178 A | | 5/1997 | Beckham | |
| 5,647,198 A | * | 7/1997 | Mihailovic | F16G 15/06 59/86 |
| 6,010,421 A | | 1/2000 | Babbitt, III | |
| 7,997,056 B2 | * | 8/2011 | Segura | B66C 1/10 59/78 |
| 2004/0075287 A1 | | 4/2004 | Chang | |

FOREIGN PATENT DOCUMENTS

| | | |
|---|---|---|
| CA | 2789292 A1 | 3/2014 |
| FR | 2229292 | 12/1974 |

\* cited by examiner

*Primary Examiner* — David B Jones
(74) *Attorney, Agent, or Firm* — Richard Malagiere, Esq.

(57) ABSTRACT

A shackle with a closure cross member having a concave cross section is disclosed. The closure cross member is inserted into the lugs at the end of a bail of a shackle such that the concave cross section is disposed between the inner faces of the lugs on the bail. The concave cross section of the closure cross member works to center a wire or rope connected to the shackle closure cross member and ensure that the wire or rope is perpendicular to the centerline of the closure cross member. The concave cross section disposed between the inner faces of the lugs on the bail ensures that the wire or rope connecting a load to the shackle remains normal to the centerline of the closure cross member regardless of the movement or orientation of the load attached to the shackle.

12 Claims, 6 Drawing Sheets

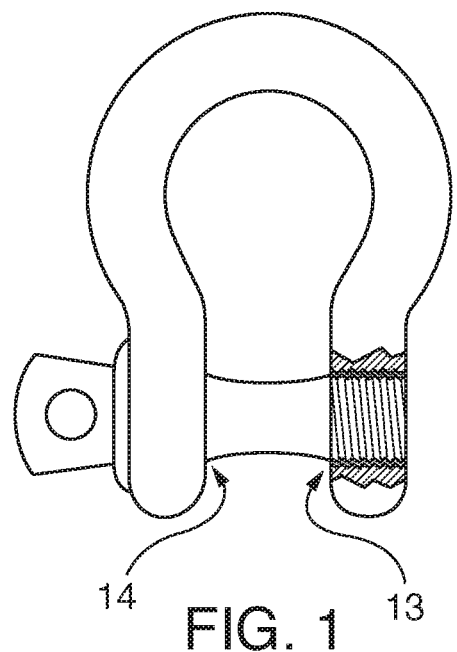
14   FIG. 1   13
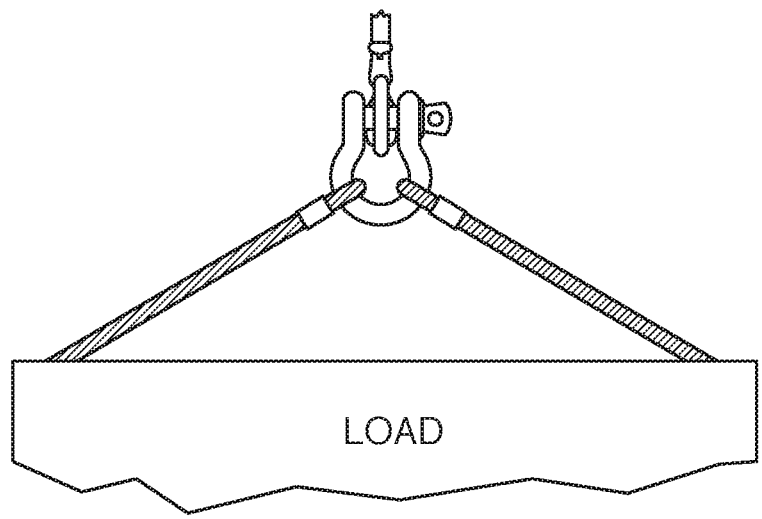
FIG. 2

SHACKLE WITH SELF CENTERING CLOSURE CROSS MEMBER

BACKGROUND OF INVENTION

The present invention is directed to a shackle with a concave shaped diameter section in the center portion of the threaded cross member between the two lugs of the shackle. This feature facilitates the automatic centering of the connection (typically, the eye of a wire or rope) loaded on the cross member of the shackle.

A shackle is comprised of a loop (referred to as the shackle body or bail)—often forged and often semi-circular in shape—with lugs located on each end. A cross member is fitted between these lugs and is typically screwed into the inside diameter of one of the lugs threaded to accept it. The cross member is also referred to as a closure pin, closure bolt or closure cross member. When using a shackle to lift a load with a crane or other hoisting device, the connection of the eye of the rope or wire on the shackle closure cross member should be at 90 degrees to the shackle closure cross member centerline. This lifting configuration provides optimum load rating for the shackle. However, this configuration is often difficult to obtain because most common shackles have a constant diameter closure cross member which allows the eye connection to the closure cross member to move along the member and naturally adjust to be at an angle less than 90 degrees to the shackle closure cross member centerline.

Currently, several stop-gap measures are used with constant diameter closure cross member shackle configurations. One such measure is to pack the closure cross member with washers on either side of the eye connection to the closure cross member. In this way, the eye of the rope or wire is centered in the middle of the closure cross member by the use of the washers on both sides of the closure cross member. Another measure calls for the use of a sleeve add-on device that fits over the closure cross member shaft. The sleeve fits between the two lugs and has a center depression which works to center the hoisting rope. The draw back with both of these stop-gap measures is that both require many different sized washers and sleeves to be available because of the many different sized shackles employed in a typical hoisting job. There is a propensity for these small type add-on parts to get lost when not in use and not be available when needed.

The prior art discloses a shackle arrangement with a bail (the loop portion of the shackle) having a lug at each end designed to accept a closure cross pin with threads on one end and a "bowed" cross pin shaft in the center portion of the bail. This configuration is described as creating a valley in which the eye of the hook or rope attached to the shackle will always ride. The difference between the prior art and the present invention is that the present invention uses the machining or casting of a conical shape in the closure cross member center portion. This results in the load on the closure cross member being in line with the centerline of the internal diameters of the lugs on the bail that support the closure cross member. The prior art provides for a "valley" resulting in the loading on the closure cross member not being in line with the centerline of the internal diameters of the lugs of the bail. The difference in loading and therefore capacity is that the prior art "valley" configuration subjects the closure cross member to additional bending loads not present with the "in line" configuration of the present invention. As such, the "valley" configuration cannot hold the same maximum load as the in-line configuration because of the additional stresses to which the valley configuration shackle is subject.

The additional difference between the prior art and the present invention is the cross-sectional area of the closure cross member. The present invention provides for a closure member with a cross-sectional area (locally reduced by the conical shaped center section) equal to the area of the larger of the two lugs attached to the loop of the shackle. The prior art configuration provides for a cross-sectional area of the cross member being less than the area of the hole of the larger of the two lugs attached to the loop of the shackle. The cross sectional area of the closure cross member is reduced because the diameter of the cross member must be less than the diameter of the hole in the larger of the two lugs to accept the cross member in its distorted configuration to create the "valley" between the two lugs when the pin is inserted between the two lugs and screwed in place.

SUMMARY OF INVENTION

A shackle comprising a bail with two lugs attached at each end, a first lug having a through hole and an outer and inner face, a second lug having a through hole and an outer and inner face, the second lug through hole being larger in diameter than the through hole of the first lug, a closure cross member with a head at one end, the closure cross member passing through the through hole of the second lug and into and through the through hole of the first lug and mating up to the outer face of the second lug by the head, the portion of the closure cross member protruding out past the through hole of the first lug being attached by mechanical means to the first lug and the closure cross member having a concave cross sectional shape between the inner faces of the first lug and second lug.

DRAWINGS

FIG. 1 is a side view of the shackle of the present invention with a partial cut away portion;

FIG. 2 is one configuration of a shackle in use;

DETAILED DESCRIPTION OF INVENTION

Figure 3:
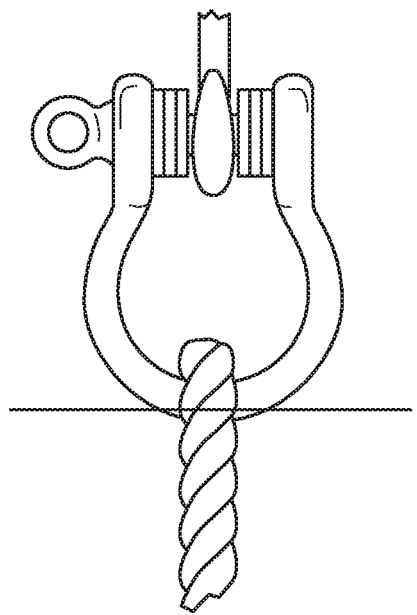
FIG. 3 is a configuration of a shackle showing washers staking each side of the shackle to center the loop on the closure cross member.
Figure 4:
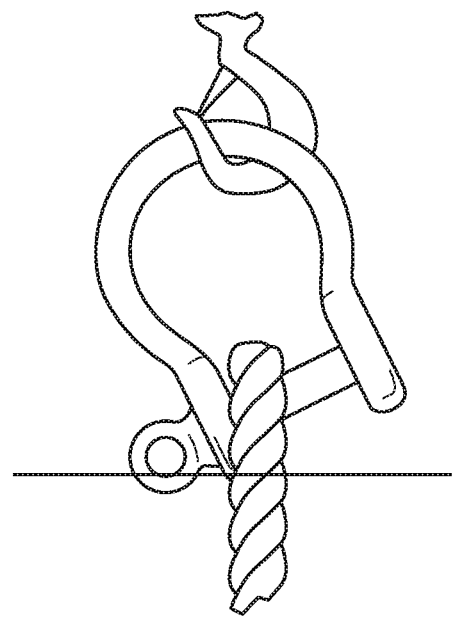
FIG. 4 is a configuration of a shackle showing side loading of the shackle closure cross member.

Shackles are used in rigging and come in a variety of sizes and load bearing capacities. Typically, a shackle has a retractable cross member (often called a closure cross member, bolt or pin) which fits through two lug holes equal in diameter located on both ends of the shackle loop (often called the shackle body or bail). FIG. 3 and FIG. 4.

Ropes or steel cables are usually rigged to a load and then connected to the main hook on a crane or other type hoist by means of a shackle. FIG. 2. Care should be taken to make certain that the connection to the closure member of the shackle is in the center of the closure member between the two lugs and at 90 degrees to the closure member pin centerline. FIG. 2 and FIG. 3. Side loading of the closure member should be avoided because the load bearing capacity of a shackle is compromised in this load configuration. FIG. 4. Instead, loading perpendicular to the cross member of the shackle and in the plane of the bow is preferred. FIG. 3. Loading of a closure pin at some angle other than perpendicular to the closure pin centerline seriously compromises the load capacity or rating of the shackle. FIG. 4. Capacity loss of 30% to 50% is experienced at load configurations which are 45 degrees from the pin centerline to in-line with the pin centerline, respectively.

Since typical shackle closure cross members are of constant diameter, ropes or cables connected to the pin typically move and adjust on the cross member as the load is lifted and moved into place. FIG. 4. Of course, this results in a loading configuration that is often at something less than 90 degrees to the closure member centerline. FIG. 4. In an effort to keep the cable at 90 degrees to the closure member centerline, washers (referred to as packing) are often used on both sides of the cable connection to the cross member along the pin packed up against the inner face of each lug on either side of the cable connection on the cross member. FIG. 3. Also, sleeves are used that fit over the closure member with a concave shape that directs the rope or cable to sit in the center of the cross member. These two solutions are impractical. Shackles come in many different sizes, so these solutions require maintaining a stock of many different sized washers and sleeves. Also, many different sized washers and sleeves would undoubtedly get lost or discarded and likely not be available when needed on a job site.

Figure 7:
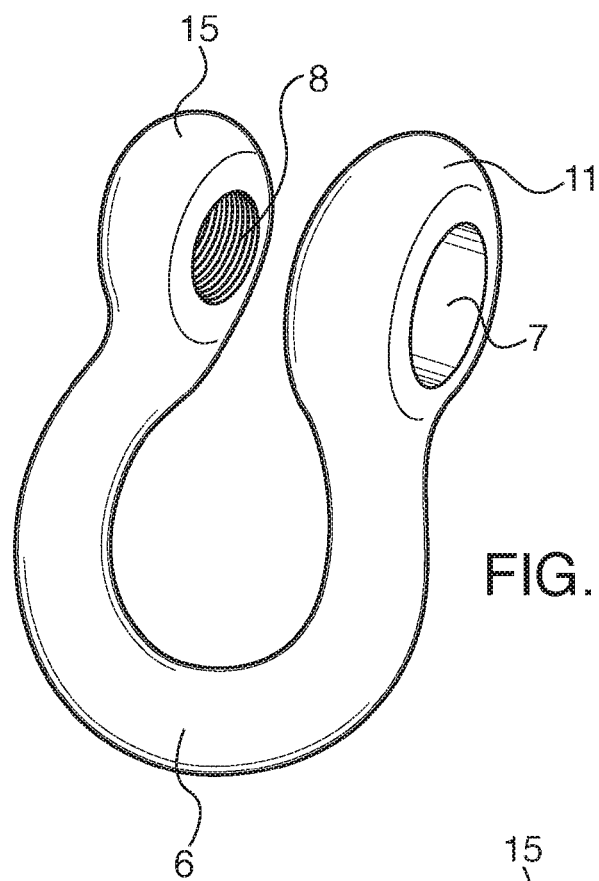
FIG. 7 is an isometric view of the shackle bail and lugs of the present invention.
Figure 8:
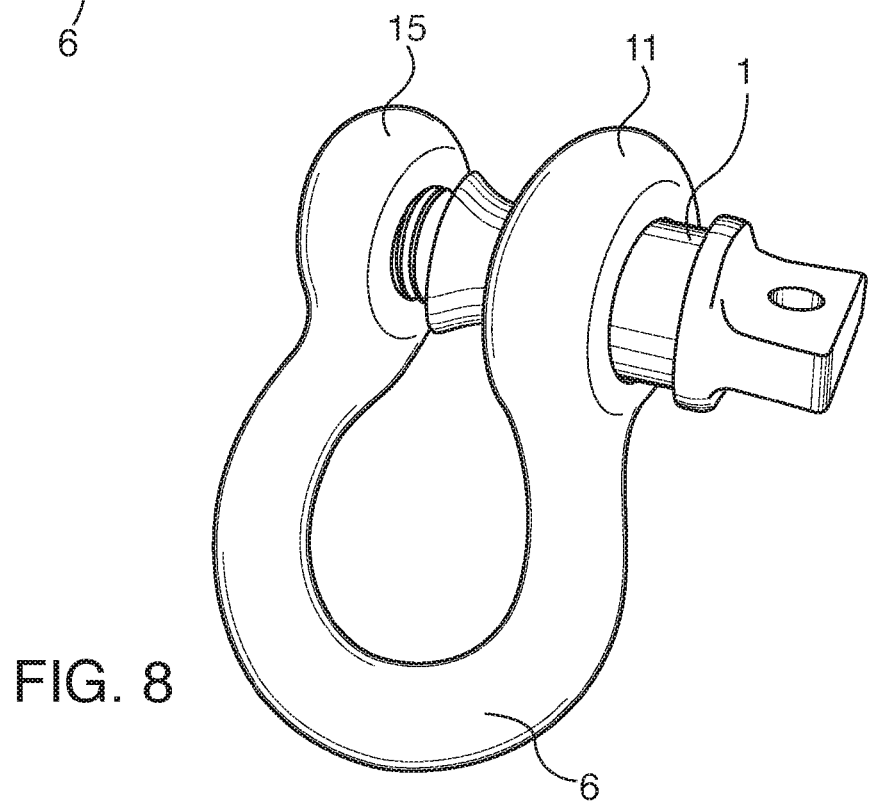
FIG. 8 is an isometric view of the shackle and closure cross member partially seated of the present invention.
Figure 9:
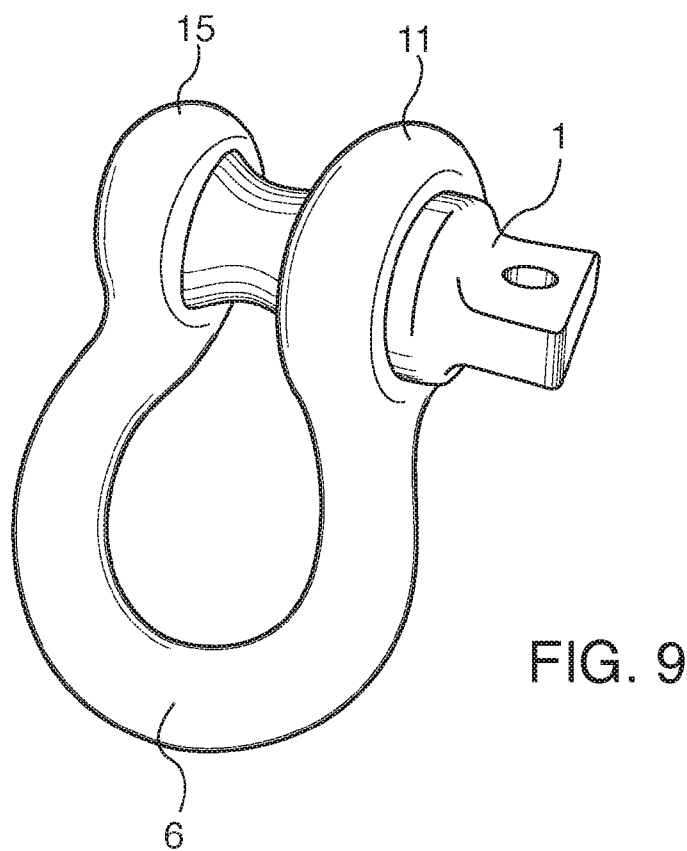
FIG. 9 is an isometric view of the shackle and closure cross member fully seated of the present invention.

In the preferred embodiment of the present invention, the closure cross member has a threaded end and a cap head end. FIG. 1, FIG. 8 and FIG. 9. The closure cross member 1 is fitted through the shackle lug without internal screw threads 7 first and then screwed into the shackle lug with internal screw threads 8. FIG. 7 and FIG. 8. In this configuration, when tightened, the cap head end of the retractable cross member is loaded up against the face of the lug without internal screw threads 11. FIG. 9.

Figure 10:
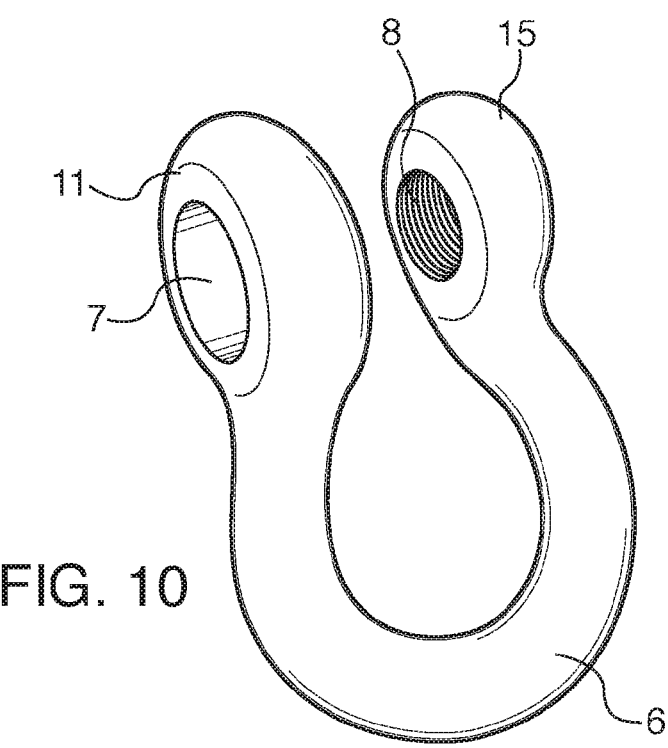
FIG. 10 is an isometric view of the shackle bail and the lugs of the present invention.
Figure 11:
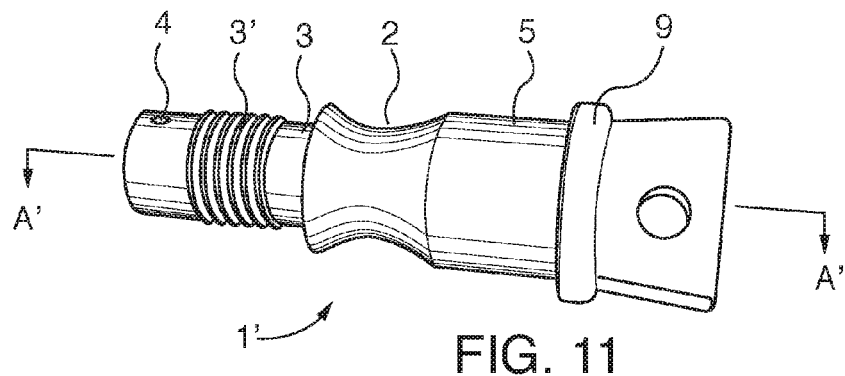
FIG. 11 is a view if the closure cross member of an alternative preferred embodiment of the present invention.
Figure 11A:
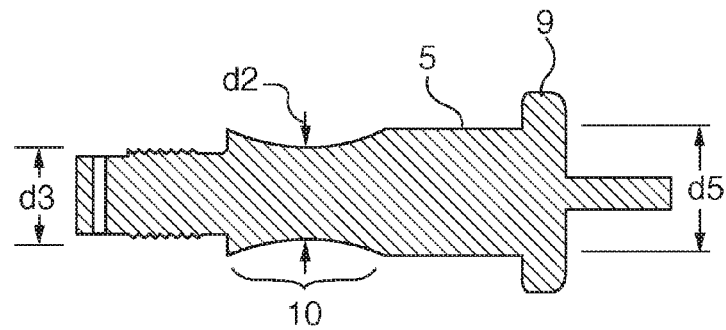
FIG. 11A is a cross section of FIG. 11 along line A'-A' of an alternative preferred embodiment of the present invention.
Figure 12:
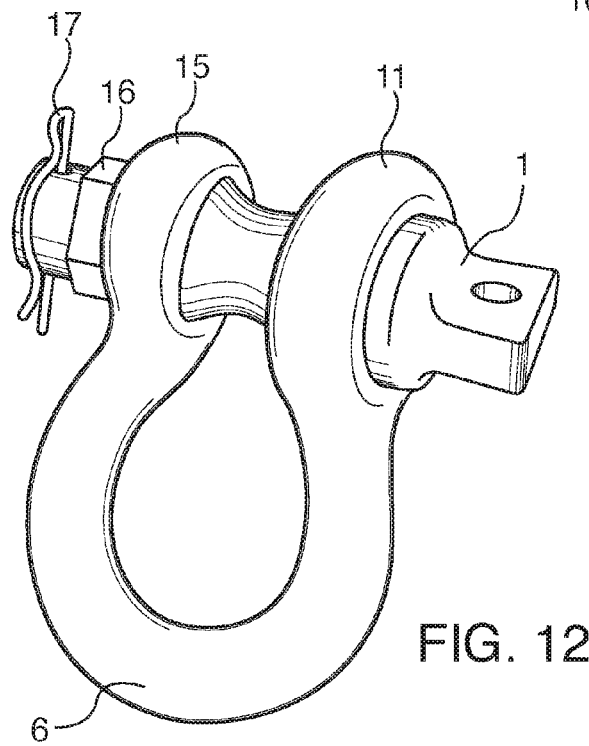
FIG. 12 is an isometric view of the shackle and closure cross member fully seated of an alternative preferred embodiment of the present invention.

In another preferred embodiment of the present invention, the closure cross member has a cylindrical end with threads 3' and a cap head end 9. FIG. 11. The closure cross member is fitted through the larger shackle lug hole 7 first and then through the smaller shackle lug hole 8 (in this embodiment, the smaller shackle lug does not have internal threads) protruding out of the smaller shackle lug. FIG. 10 and FIG. 12. Here, the portion of the cylindrical end of the closure cross member protruding out of the smaller shackle lug hole 8 is secured by mechanical means such as a nut 16 screwed onto the threads 3' of the cross member 1' protruding out of the smaller shackle lug 15. FIG. 11 and FIG. 12. This nut 16 is secured in place and torqued up against the outer face of lug 15 and blocked from backing off of the cross member 1' threads 3' by a pin 17 fitted into and through hole 4 located perpendicular to the circumference of that portion of the closure cross member 1' protruding past the nut tightened down to the smaller shackle lug face 15. FIG. 11, FIG. 11A and FIG. 12. The pin 17 is placed through the hole 4 and sticks out in order to block the nut 16 torqued down against the outer face 15 of the smaller shackle lug from backing out. FIG. 12.

Figure 5:
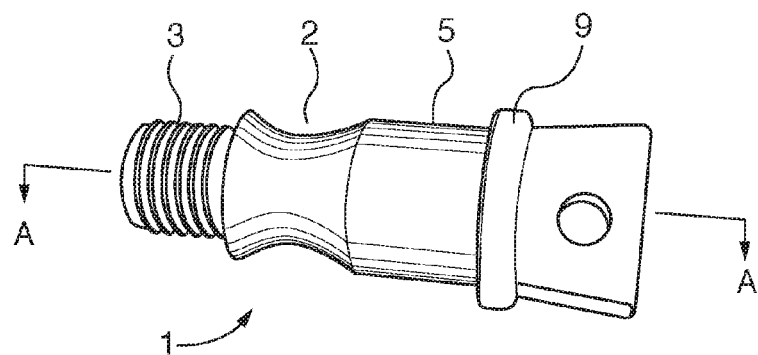
FIG. 5 is a view if the closure cross member of the present invention.
Figure 5A:
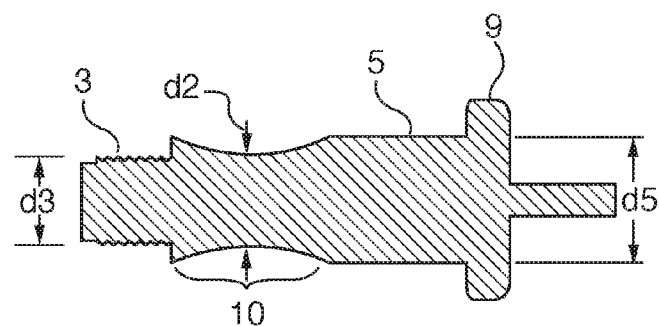
FIG. 5A is a cross section of FIG. 5. along line A-A.

In either preferred embodiment, the present invention is directed to a shackle with a closure member 1 or 1' depicted in FIG. 5 and FIG. 5A and FIG. 11 and FIG. 11A with a concave depression 10 in the center of the closure cross member between the two inner lug faces 13 and 14 on FIG. 1 in the center of the bow. FIG. 1, FIG. 5, FIG. 5A, FIG. 11 and FIG. 11A. The concave depression 10 reduces the diameter of the cross member d2 locally to the thread diameter d3 of the closure member. FIG. 5A and FIG. 11A. In this way, the shackle load rating is based on both the thread diameter d3 of the closure cross member 1 or 1' which is the same as the local diameter d2 across the lowest point on the concave depression 2 between the lug inner faces 13 and 14 and the diameter of that portion of the closure cross member d5 fitted into the larger of the two lugs on the shackle 11. FIG. 5, FIG. 5A, FIG. 11, FIG. 11A, and FIG. 1.

Figure 6:
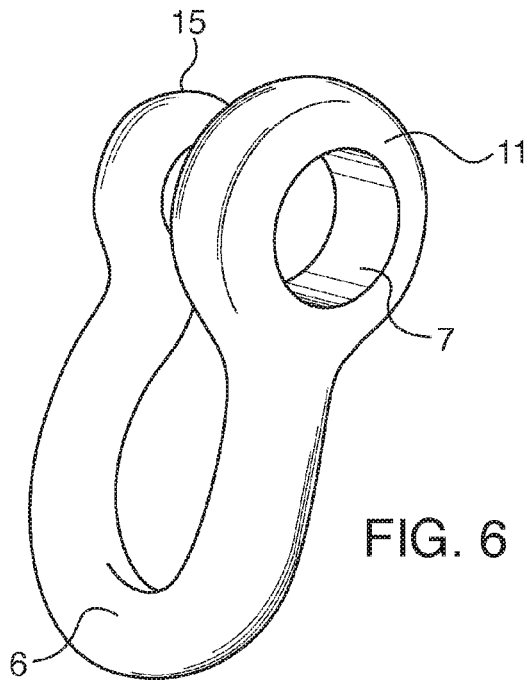
FIG. 6 is a side view of the shackle bail and larger lug of the present invention.

The closure cross member has a local major diameter d5 which is slightly smaller than the larger lug inner diameter 7 on the end of the bail 6. FIG. 5A, FIG. 6 and FIG. 11A. This larger lug inner diameter 7 forms the through hole for the closure member 1 or 1' and the larger lug outer face 11 forms the stop against which the cap 9 of the closure member mates up against when the shackle is closed and the closure cross member screwed into the threaded lug 8 or nut 16, as the case may be. FIG. 7, FIG. 9 and FIG. 12.

The closure cross member 1 or 1' has a nominal diameter d2 formed by the reduction of the closure cross member into a concave cross section 10 between the inner faces of the two lugs 13 and 14. FIG. 1, FIG. 5a and FIG. 11a. This diameter at the lowest point of the concave cross-section of the closure cross member d2 is equal to the threaded diameter of the closure cross member d3. FIG. 5, FIG. 5a, FIG. 11 and FIG. 11A. This threaded end of the closure cross member 3 is screwed into the threaded lug 8 on the end of the bail 6. FIG. 5 and FIG. 7. The head of the closure cross member 9 is loaded up against the outer face of the larger lug on the end of the bail 11. FIG. 8. Alternatively, the threaded end of the closure cross member 3' is screwed into nut 16 and thereby loaded up against the outer face of the smaller lug 15. FIG. 12. Here again, in this alternative embodiment, the head of the closure cross member 9 is loaded up against the outer face of the larger lug on the end of the bail 11. FIG. 12.

The configurations of the present invention provide for a mechanism where the rope or cable attached to the closure cross member of a shackle will automatically have a 90 degree interface with the centerline of the closure cross member.

Those of the ordinary skill in the art will recognize that the foregoing merely represents an embodiment of the present invention. Many obvious modifications may be made thereto without departing from the spirit or scope of the present invention as set forth in the appended claims.

The invention claimed is:
1. A shackle comprising the following elements:
   a bail with two lugs attached at each end;
   a first lug having a through hole and an outer and inner face;

a second lug having a through hole and an outer and inner face;
the second lug through hole being larger in diameter than the through hole of the first lug;
a closure cross member with a head at one end;
the closure cross member passing through the through hole of the second lug and into and through the through hole of the first lug and mating up to the outer face of the second lug by the head;
the portion of the closure cross member passing into and through the through hole of the first lug being attached by mechanical means to the first lug;
the closure cross member having a concave cross sectional shape between the inner faces of the first lug and second lug.

2. A shackle comprising the following elements:
a bail with two lugs attached at each end;
a first lug having a through hole and an outer and inner face and internally threaded;
a second lug having a through hole and an outer and inner face;
the second lug through hole being larger in diameter than the through hole of the first lug;
a closure cross member with a head at one end and threads on the other end;
the closure cross member passing through the through hole of the second lug and into and through the through hole of the first lug and mating up to the outer face of the second lug by the head;
the portion of the closure cross member passing into and through the through hole of the first lug being attached by screw means to through hole of the first lug;
the closure cross member having a concave cross sectional shape between the inner faces of the first lug and second lug.

3. A shackle as in claim 1, wherein the lugs are circular.
4. A shackle as in claim 2, wherein the lugs are circular.
5. A shackle as in claim 1, wherein the bail is u shaped.
6. A shackle as in claim 2, wherein the bail is u shaped.
7. A shackle as in claim 1, wherein the bail is semicircular.
8. A shackle as in claim 2, wherein the bail is semicircular.
9. A shackle as in claim 1, wherein the head is a thumb screw head with a plate having a circular hole through the plate.
10. A shackle as in claim 2, wherein the head is a thumb screw head with a plate having a circular hole through the plate.
11. A shackle as in claim 1, wherein the closure cross member has a circular hyperboloid shape between the inner faces of the first lug and second lug.
12. A shackle as in claim 2, wherein the closure cross member has a circular hyperboloid shape between the inner faces of the first lug and second lug.

* * * * *